United States Patent [19]

Hayati et al.

[11] 4,014,703

[45] Mar. 29, 1977

[54] ONE PACKAGE COATING COMPOSITION

[75] Inventors: Hossein Hayati; Russell S. Towers, both of Adrian, Mich.

[73] Assignee: Stauffer Chemical Company, Adrian, Mich.

[22] Filed: Apr. 4, 1975

[21] Appl. No.: 565,301

[52] U.S. Cl. .................................... 106/1; 106/14; 106/287 SE

[51] Int. Cl.$^2$ .......................................... C09D 5/10

[58] Field of Search ................... 106/14, 1, 287 SE

[56] References Cited

UNITED STATES PATENTS

| | | | |
|---|---|---|---|
| 3,056,684 | 10/1962 | Lopata et al. | 106/14 |
| 3,730,743 | 5/1973 | McLeod | 106/1 |
| 3,832,204 | 8/1974 | Boaz | 106/14 |
| 3,917,648 | 11/1975 | McLeod | 106/1 |

*Primary Examiner*—Lorenzo B. Hayes

[57] ABSTRACT

A vehicle composition for particulate solids comprising a condensate of an alkyl polysilicate having an $SiO_2$ content of about 40 percent, zinc chloride and an organic solvent. The resulting vehicle composition is mixed with a cathodically active metal and, if desired, fillers to form a coating which exhibits a high degree of stability and is highly resistant to corrosion.

12 Claims, No Drawings

ONE PACKAGE COATING COMPOSITION

This invention relates to a vehicle composition, particularly a vehicle composition containing particulate solids and more particularly to a one-package zinc-filled vehicle composition which, when applied to a metallic surface, will impart galvanic protection thereto.

Zinc-filled protective coatings have been used to protect metal surfaces, particularly ferrous surfaces, against corrosion. For example, U.S. Pat. No. 3,056,684 to Lopata discloses a zinc-filled coating which utilizes a partially hydrolyzed tetraethyl orthosilicate as a vehicle. Another approach to preparing zinc-filled protective coatings is disclosed in U.S. Pat. No. 3,730,743 to McLeod, in which zinc dust is incorporated in a vehicle composition obtained from the hydrolysis and condensation of an alkyl polysilicate. When these vehicles are mixed with zinc and applied to a surface, the resultant coating sets up or dries in a matter of a few hours. However, if the zinc is added to the vehicle at the time of packaging, the reactivity of the zinc with the vehicle causes gelation within a matter of hours, resulting in an unacceptable short "shelf life".

Many of the single package zinc-filled protective coatings prepared heretofore have a secondary problem with gas evolution. In such formulations, a gas, apparently hydrogen, is generated in the container when stored at room temperature for periods exceeding about 2 months. One approach to the problem of gas evolution in a one-package zinc filled coating is to package the material in a container having a pressure release valve which will permit hydrogen to escape. However, such deviation from standard packaging procedures is undesirable, requiring specialized containers and complicates the manufacturing procedure. Moreover, such an approach involves a safety hazard since evaporating flammable solvents also may escape through the pressure release valve.

Other zinc rich coating compositions which contain a substantially nonaqueous colloidal silica suspended in an organic solvent, zinc chloride and zinc dust have been described in U.S. Pat. No. 3,615,730 to Law. It has been found that these coatings have certain disadvantages, e.g., they are stable only for periods up to one month.

Thus, it has been impossible to prepare the single package zinc filled silicate coating compositions described above which are stable up to several months and which produce coatings equal to the coating qualities of this invention.

Therefore, it is an object of this invention to prepare a vehicle composition. Another object of this invention is to provide a single package coating composition containing cathodically active metals. Another object of this invention is to provide a single package zinc-filled coating composition for ferrous substrates. Still another object of this invention is to provide a single package zinc filled coating composition which is substantially free of hydrogen evolution. A further object of this invention is to provide a single package zinc filled coating composition which provides a hard abrasion resistant coating on a ferrous substrate in from 1 to 24 hours and has a "shelf life" of at least 4 months.

It has now been found that a superior single package protective coating can be prepared from a vehicle containing an alkyl polysilicate which has been hydrolyzed to a level of from 50 to 65 percent, zinc chloride and an organic solvent. The resultant vehicle is combined with a cathodically active metal and, if desired, fillers, and applied to ferrous substrates to form a protective coating thereon.

The alkyl polysilicate useful in this invention is an alkyl polysilicate preferably ethyl polysilicate, which is a mixture of ethyl polysilicates having about 40 percent available silica and contains an average of about 5 silicon atoms per molecule. It may be derived from the controlled hydrolysis of tetraethyl silicate. The formula for the ethyl polysilicate may be represented as follows:

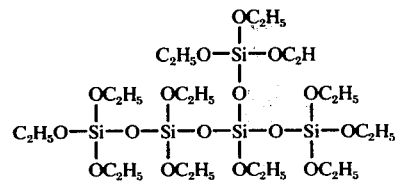

[Additional information for preparing the partial hydrolysis products of the monomeric organosilicon compounds described above may be found in the article by H. D. Hogan and C. A. Setterstrom entitled "Ethyl Silicates" in Industrial and Engineering Chemistry, Volume 39, page 1364, No. 11 (1947).]

The vehicle composition is prepared by mixing the ethyl polysilicate with sufficient water and acid catalyst to hydrolyze the ethyl polysilicate to a level of from 50 to 65 percent in the presence of an organic solvent having a boiling range of from about 80° C. up to about 250° C. It has been found that the level of hydrolysis is critical in order to provide a one package coating composition having the desired hardness, "shelf life" and "pot life". If the hydrolysis level of the alkyl polysilicate is below about 50 percent, the pencil hardness of the resultant coating after one hour is less than 4B and after 24 hours the pencil hardness is about F. When the hydrolysis level of the alkyl polysilicate exceeds about 65 percent, the pencil hardness of the resultant coating after 1 hour is about 3B and after 24 hours about 6H; however, the "pot life" of the coating composition is only 2 days and the shelf life is only about 10 days.

The "hydrolysis level" or "degree of hydrolysis" refers to the amount of water that is necessary to hydrolyze from 50 to 65 percent of the alkoxy groups linked to the silicon atoms, calculated on the basis of tetraethyl orthosilicate. Thus, when an alkyl polysilicate is employed, the amount of water necessary to provide a hydrolysis level of from 50 to 65 percent ranges from 0.08 to 0.21 mole of water per mole of alkoxy on the alkyl polysilicate.

Although it is not essential, it is preferred that a solvent be employed in the preparation of the vehicle composition of this invention. Examples of preferred solvents are the higher boiling ethers such as monoalkylene glycol monoalkyl ethers, dialkylene glycol monoalkyl ethers, dialkylene glycol dialkyl ethers and the monoalkylene glycol dialkyl ethers. Others which may be employed are ketones such as acetone; alcohols such as ethanol, isopropanol, butanol, hexanol, diacetone alcohol; glycols such as ethylene glycol and polyalkylene glycols; hydrocarbon solvents such as hexane, benzene, toluene, xylene; chlorinated hydrocarbon solvents and mixtures thereof. The drying time, viscosity and so forth may be adjusted by proper choice of solvents or mixtures thereof.

The solvent to alkyl polysilicate ratio is subject to wide variation depending on the characteristics desired in the finished binder. Thus, the ratio may lie anywhere within the limits of from about 0.5:1 to 10:1.

Although the amount of acid necessary for the hydrolysis of the alkyl polysilicate is not critical, it is preferred that sufficient acid be present to provide a pH of from about 1.0 to about 6.5 and more preferably from about 1.4 to 5.5. Suitable inorganic acids which may be employed are hydrochloric acid, sulfuric and hydrofluoric acid. These acids may be used either alone or in combination.

Also, monobasic and dibasic organic acids may be used as well as metal chlorides, nitrates, sulfates, and metal salts of carboxylic acids where the metal is a member selected from Groups II, III and IV of the Periodic Table. Examples of suitable organic acids are acetic acid, butyric acid, caproic acid, capric acid, palmitic acid, oleic acid, oxalic acid, fumaric acid, crotonic acid, acrylic acid, maleic acid, malonic acid, succinic acid, glutaric acid, adipic acid, suberic acid and sebacic acid. Other organic acids which may be used are benzoic acid, toluene sulfonic acid, alkyl phosphoric acids in which the alkyl groups contain from 1 to 4 carbon atoms and halogenated carboxylic acids.

The techniques for preparing the vehicle compositions are known in the art; however, it is preferred that the above polysilicate be dissolved in an organic solvent and thereafter sufficient water, preferably an acidized water, is added to provide a hydrolysis range of from 50 to 65 percent. The hydrolysis temperature is not critical and may range from about 25° C. up to about 80° C. and more preferably from 30 to about 50° C.

The vehicle composition is prepared by adding zinc chloride to the hydrolysate in an amount of from about 3 to 5.5 percent and more preferably from about 3.5 to 5 percent by weight based on the total weight of the hydrolysate (hydrolyzed silicate and organic solvent).

A coating composition is prepared by mixing the vehicle composition described about with finely divided particulate solids, e.g., cathodically active metals such as zinc dust and, if desired, fillers and thereafter agitated in the presence of an inert atmosphere for at least 0.5 hour. The coating composition is applied to metal substrates to impart galvanic protection thereto. Other cathodically active metals which may be employed are aluminum and magnesium. Fillers or extenders which may be employed in these coatings are metal oxides such as lead oxide, iron oxide, alumina, titanium dioxide, di-iron phosphide and the like. Frequently, it is desirable to employ in lieu of the pure metal dust, a mixture of metal dust and a suitable filler as calcium and magnesium meta-silicate or minerals containing the same. Other fillers, particularly fibrous mineral fillers such as asbestos, silica, refined clays, fibrous talc, fibrous calcium meta-silicate, gypsum and the like may also be incorporated with the metal dust such as zinc dust in these coating compositions. Additional materials which may be included in the coating compositions are pigments such as zinc chromate, cadmium sulfide, and most of the lithopones.

The ratio of vehicle to particulate solids is largely a matter of customer preference or of the specifications to be met. Generally, the ratio of vehicle to particulate solids, i.e., a cathodically active metal and filler, is within the range of from 70:30 to 10:90 on a weight basis. However, where a filler is not included in the composition such as the previously mentioned calcium and magnesium meta-silicates, then the ratio of vehicle to cathodically active metal is preferably from about 10:90 to about 50:50 on a weight basis.

Generally, these coatings can be cured at ambient temperature in from about 1 to 24 hours; however, if desired, the coatings may be heat cured at temperatures ranging from about 40° C. to as high as 500° C. Obviously, at these elevated temperatures, the cure time will be substantially reduced.

The preferred coatings conforming to the present invention have a flash point from about 80° F. to about 150° F. (tag open cup method) and a pot life meeting the requirements of substantially any field of use.

Oftentimes it is desirable to add additional organic solvent to these coating compositions to form thin film coatings on metal substrates. These dilute compositions are particularly suitable as "shop primers", i.e., they are especially adaptable for use as preconstruction primers to provide protection for steel plates prior to their incorporation into a structure such as a ship. The finished structure may then be coated with the more concentrated coating composition of this invention.

These coating compositions may be applied to a cleaned metal substrate by painting, spraying or other conventional techniques known in the art. They display excellent adhesion on application and in some cases, may be applied successfully to clean, steel surfaces without prior sandblasting. Good adherence to damp galvanized surfaces has been achieved. These coating compositions will not freeze nor are the coatings adversely affected by bright sunlight at tropical temperatures. The coatings show very good resistance to salt spray, fuels and organic solvents. These coatings may be easily pigmented, hence they can be employed without any overcoat.

The coating compositions of this invention have very unique properties, i.e., they can be formulated into a single package system, stored for periods of at least 6 months without gel formation and are substantially free of gas formation.

The invention is further illustrated by the following examples in which all parts are by weight unless otherwise specified.

EXAMPLE 1 a. A hydrolysate is prepared by slowly adding with agitation 22.5 parts of deionized water to a reactor containing 1000 parts of ethyl silicate "40", 1177 parts of ethylene glycol monoethyl ether and 3 parts of zinc chloride and thereafter the reaction mixture is agitated for about 2 hours at a temperature up to about 60° C.

To about 1000 parts of the hydrolysate prepared above are added about 40 parts of zinc chloride and the mixture is heated for 2 hours at 45° C. with agitation to form a vehicle composition.

b. A coating composition is then prepared by mixing 241 parts of the vehicle composition prepared above with 21 parts of "Celite 499", 3 parts of "Bentone 27" and 735 parts of zinc dust (2 to 7 microns) with agitation in an inert atmosphere for 0.5 hour and thereafter applied to a light sandblasted steel substrate. After drying at a 50 percent relative humidity at 77° F., the coating is tested after 1 hour and again after 24 hours for hardness in accordance with the standard hardness test. In this test, a pencil lead is employed having varying degrees of hardness corresponding to the scale 6B, 4B, 3B, F, H, 2H, 3H, 4H, 5H, etc. These values represent a progressive increase in hardness. The pencil lead is held at a 45° angle relative to the zinc coating as laid down on the steel panel and moderate force is applied until the coating is removed. The properties, e.g., hardness, "shelf life" and "pot life" are illustrated in the following Table. The "shelf life" and "pot life" was determined at 25° C.

EXAMPLE 2 a. The procedure described in Example 1(a) is repeated except that 48 parts of water are added to a reactor containing 1115 parts of ethylene glycol monoethyl ether, 1000 parts of ethyl silicate "40" and 3 parts of zinc chloride. To about 1000 parts of the hydrolysate thus formed are added about 40 parts zinc chloride and the mixture is heated for 2 hours at 45° C. to form a vehicle composition.

b. A coating composition is prepared in accordance with Example 1(b) except that the vehicle composition prepared in Example 2(a) is substituted for the vehicle prepared in Example 1(a). The composition is applied to a steel panel and the hardness value is determined after drying for 1 hour and again after 24 hours at 50 percent relative humidity at a temperature of 77° F. The properties are illustrated in the following Table.

EXAMPLE 3 a. The procedure described in Example 1(a) is repeated except that 60 parts of water are added to a reactor containing 1140 parts of ethylene glycol monoethyl ether, 1000 parts of ethyl silicate "40" and 3 parts of zinc chloride.

A vehicle composition is prepared by adding about 40 parts of zinc chloride to about 1000 parts of the hydrolysate prepared above.

b. A coating composition is prepared in accordance with Example 1(b) except that the vehicle composition prepared in Example 3(a) is substituted for the vehicle prepared in Example 1(a). The composition is applied to a steel panel and the hardness value is determined after drying for 1 hour and again after 24 hours at 50 percent relative humidity at a temperature of 77° F. The properties are illustrated in the following Table.

EXAMPLE 4 a. The procedure described in Example 1(a) is repeated except that 72 parts of water are added to a reactor containing 1128 parts of ethylene glycol monoethyl ether, 1000 parts of ethyl silicate "40" and 3 parts of zinc chloride.

The resultant hydrolysate is then mixed with zinc chloride in a ratio of 40 parts zinc chloride for each 1000 parts of the hydrolysate to form a vehicle composition.

b. A coating composition is prepared in accordance with Example 1(b) except that the vehicle composition prepared in Example 4(a) is substituted for the vehicle of Example 1(a). The coating is applied to a steel panel and the hardness value is determined after drying for 1 hour and again after 24 hours at 50 percent relative humidity at a temperature of 77° F. The properties of the coating composition are illustrated in the following Table.

EXAMPLE 5 a. The procedure described in Example 1(a) is repeated except that 96 parts of water are added to a reactor containing 1096 parts of ethylene glycol monoethyl ether, 1000 parts of ethyl silicate "40" and 3 parts zinc chloride to form a hydrolysate.

The resultant hydrolysate is then mixed with zinc chloride in a ratio of 40 parts zinc chloride for each 1000 parts of the hydrolysate to form a vehicle composition.

b. A coating composition is prepared in accordance with Example 1(b) except that the vehicle composition prepared in Example 5(a) is substituted for the vehicle of Example 1(a). The coating is applied to a steel panel and the hardness value determined after drying for 1 hour and again after 24 hours at 50 percent relative humidity at a temperature of 77° F. The properties are illustrated in the following Table.

EXAMPLE 6 a. For purposes of comparison, a composition is prepared in accordance with the procedure described in Example 1(a) in which 1000 parts of ethyl silicate "40" is mixed with 1200 parts of ethylene glycol monoethyl ether and 3 parts of zinc chloride.

The resultant composition is then mixed with zinc chloride in a ratio of 40 parts zinc chloride for each 1000 parts of the composition to form a vehicle.

b. A coating is prepared in accordance with Example 1(b) except that the vehicle composition prepared in Example 6(a) is substituted for the vehicle of Example 1(a). The composition is applied to a steel panel and the hardness value determined after drying for 1 hour and again after 24 hours at 50 percent relative humidity at a temperature of 77° F. The properties are illustrated in the following Table.

EXAMPLE 7 a. For purposes of comparison, a vehicle composition is prepared in accordance with the procedure described in Example 1(a) except that the 40 parts of zinc chloride is omitted.

b. A coating composition is then prepared in accordance with Example 1(b) except that the vehicle composition prepared in Example 7(a) is substituted for the vehicle of Example 1(a). The composition is applied to a steel substrate and the properties determined in accordance with Example 1(b). The properties are illustrated in the following Table.

EXAMPLE 8 a. For purposes of comparison, 20 parts of zinc chloride is mixed with the hydrolysate prepared in accordance with the procedure described in Example 1(a).

b. The resultant vehicle composition is then mixed with zinc dust in accordance with Example 1(b) except that the vehicle composition prepared in Example 8(a) is substituted for the vehicle of Example 1(b). The composition is applied to a steel substrate. The properties of the coating composition are shown in the following Table.

EXAMPLE 9 a. A hydrolysate is prepared by mixing 1000 parts of ethyl silicate "40" with 1220 parts of ethylene glycol monoethyl ether, 44 parts of water and 3 parts of zinc chloride in accordance with the procedure described in Example 1(a). To about 1000 parts of the hydrolysate prepared above are added 124 parts of zinc chloride and the mixture is heated to 45° C. for 2 hours with agitation to form a vehicle composition.

b. A coating composition is prepared by adding 735 parts of zinc dust (2 to 7 microns), 25 parts of "Celite 499" and 3 parts of "Bentone 27" to about 241 parts of the vehicle composition prepared in 9(a) above and agitated for 0.5 hour in an inert atmosphere. The properties of the resulting coating are illustrated in the following Table.

EXAMPLE 10 a. For purposes of comparison, a hydrolysate is prepared by mixing 1500 parts of tetraethyl orthosilicate with 655 parts of ethylene glycol monethyl ether, 154 parts of water and 3 parts zinc chloride in accordance with the procedure described in Example 1(a). To about 1000 parts of the hydrolysate composition are added 40 parts of zinc chloride and the mixture is heated to 45° C. for 2 hours with agitation to form a vehicle composition.

b. A coating composition is prepared by adding 21 parts of "Celite 499", 3 parts of "Bentone 27" and about 735 parts of zinc dust (2 to 7 microns) to about 241 parts of the vehicle composition prepared in 10(a) above and agitated for 0.5 hour in an inert atmosphere. The properties of the resulting coating are illustrated in the following Table.

TABLE

| Example No. | Mole H₂O/ Mole Alkoxy | Degree of Hydrolysis, percent | Zinc Chloride, percent | Hardness 1 Hr. | Hardness 24 Hrs. | "Pot life" (days) | Shelf life (Vehicle composition) | Shelf life (Coating composition) |
|---|---|---|---|---|---|---|---|---|
| 1. | 0.08 | 50 | 4.0 | 4B | 5H | 30 | > 4 months | > 4 months |
| 2. | 0.17 | 60 | 4.0 | 3B | 6H | 30 | > 4 months | > 4 months |
| 3. | 0.21 | 65 | 4.0 | 3B | 6H | 25 | > 4 months | > 3 months |
| 4. | 0.25 | 70 | 4.0 | 3B | 6H | 2 | > 4 months | 10 days |
| 5. | 0.33 | 80 | 4.0 | 3B | 6H | 2 | 10 days | 2–3 days |
| 6. | 0.00 | 40 | 4.0 | 4B | F | 30 | 22 4 months | > 4 months |
| 7. | 0.08 | 50 |  | 6B | 6B | 30 | > 4 months | > 4 months |
| 8. | 0.08 | 50 | 2.0 | 6B | F | 30 | > 4 months | > 4 months |
| 9. | 0.15 | 58 | 5.4 | 6B | 2H | 30 | 22 4 months | > 4 months |
| 10. | 0.29 | 59* | 4.0 | 6B | 3H | 30 | > 4 months | > 4 months |

*Tetraethyl orthosilicate

It will be observed from the Table that cooling compositions containing zinc chloride and ethyl polysilicate which have been hydrolyzed to a level of from 50 to 65 percent have a "shelf life" greater than 3 months, whereas similar coating compositions in which the ethyl polysilicate is hydrolyzed to a level of at least 70 percent, have a "shelf life" of only 10 days or less. Moreover, the Table shows that when zinc chloride is omitted from a coating composition containing ethyl polysilicate hydrolyzed to a level of 50 percent, the hardness after 1 hour and again after 24 hours was unacceptable. Also, it can be observed that when tetraethyl orthosilicate is substituted for ethyl polysilicate and hydrolyzed to the same degree, the hardness value of the resulting coating after 1 hour is unsatisfactory and after 24 hours is inferior to the coatings of this invention.

Although specific examples have been described herein, it is intended to include all the variations and modifications falling within the spirit and scope of the appended claims.

What is claimed is:

1. A vehicle for a single package coating composition consisting essentially of a hydrolyzed alkyl polysilicate having a hydrolysis level of from 50 to 65 percent, an organic solvent and from 3 to 5.5 percent by weight of zinc chloride based on the total weight of the hydrolysate, said hydrolysate is obtained by hydrolyzing the alkyl polysilicate containing about 40 percent SiO₂ in the presence of an organic solvent, and water in an amount of from about 0.08 to about 0.21 mole per mole of alkoxy present on the alkyl polysilicate at a pH of from 1.0 to 6.5.

2. The vehicle of claim 1 wherein the alkyl polysilicate is ethyl silicate "40".

3. A single package coating composition containing the vehicle of claim 1 and particulate solids.

4. The composition of claim 3 wherein the particulate solids are cathodically active metals.

5. The composition of claim 4 wherein the particulate solids also include a filler.

6. The composition of claim 4 wherein the cathodically active metal is zinc.

7. The composition of claim 5 wherein the vehicle to particulate solids are in a ratio of from 10:90 to 70:30.

8. A method for preparing a single package coating composition which comprises mixing particulate solids with a vehicle and after agitating for at least 0.5 hour in an inert atmosphere packaging the composition, said vehicle consisting essentially of a hydrolyzed alkyl polysilicate having a hydrolysis level of from 50 to 65 percent and zinc chloride in an amount of from 3 to 5.5 percent by weight based on the total weight of the hydrolysate, said hydrolysate is obtained by hydrolyzing the alkyl polysilicate containing about 40 percent SiO₂ with from about 0.08 to about 0.21 mole of water per mole of alkoxy present on the alkyl polysilicate at a pH of from 1.0 to 6.5 in the presence of an organic solvent to form the hydrolysate.

9. The method of claim 8 wherein the particulate solids are cathodically active metals.

10. The method of claim 9 wherein the cathodically active metal is zinc.

11. The method of claim 8 wherein the vehicle to particulate solids is in a ratio of from 10:90 to 70:30.

12. The method of claim 9 wherein the vehicle to cathodically active metal is in a ratio of from 10:90 to 50:50.

* * * * *